(12) United States Patent
Jacobé De Naurois et al.

(10) Patent No.: US 12,164,570 B2
(45) Date of Patent: Dec. 10, 2024

(54) DIGITAL DATA TRACING METHOD

(71) Applicant: THALES, Courbevoie (FR)

(72) Inventors: Charlotte Jacobé De Naurois, Palaiseau (FR); Claire Laudy, Palaiseau (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 18/255,528

(22) PCT Filed: Dec. 1, 2021

(86) PCT No.: PCT/EP2021/083829
§ 371 (c)(1),
(2) Date: Jun. 1, 2023

(87) PCT Pub. No.: WO2022/117677
PCT Pub. Date: Jun. 9, 2022

(65) Prior Publication Data
US 2024/0020341 A1 Jan. 18, 2024

(30) Foreign Application Priority Data
Dec. 3, 2020 (FR) ..................................... 20 12607

(51) Int. Cl.
*G06F 16/901* (2019.01)
*G06F 16/907* (2019.01)

(52) U.S. Cl.
CPC ........ *G06F 16/9024* (2019.01); *G06F 16/907* (2019.01)

(58) Field of Classification Search
CPC ........................... G06F 16/9024; G06F 16/907
See application file for complete search history.

(56) References Cited

U.S. PATENT DOCUMENTS

| 2009/0313331 A1* | 12/2009 | Rasmussen | G06F 40/197 709/205 |
| 2010/0306278 A1* | 12/2010 | Oliver | G06F 16/24554 707/800 |

(Continued)

FOREIGN PATENT DOCUMENTS

| FR | 2940487 A1 | 6/2010 |
| FR | 2986636 A1 | 8/2013 |

OTHER PUBLICATIONS

Laudy et al.: "Semantic information fusion algebraic framework applied to content marketing", 978-0-9964527-7-9 © 2018 ISIF ( Year: 2018).*

(Continued)

*Primary Examiner* — Kuen S Lu
(74) *Attorney, Agent, or Firm* — Pearne & Gordon LLP

(57) ABSTRACT

A digital method for tracing data from a plurality of data sources includes the steps of: a. obtaining initial data originating from a plurality of data sources, each initial datum comprising initial elements and initial connections, each initial element having a type and a value, b. determining a final datum on the basis of at least two initial data following the merging with one another of initial elements of the initial data according to a merging strategy, the merged initial elements making it possible to obtain a merged element having a type and a value, and c. determining a merging history for each merged element, the merging history comprising the type and the value of each initial element from which the merged element originates, the type and the value of the merged element, and data relating to the merging strategy.

8 Claims, 8 Drawing Sheets

(56) References Cited

U.S. PATENT DOCUMENTS

2015/0120663 A1* 4/2015 Le Scouarnec ......... H04L 67/10
                                                      707/638
2020/0021607 A1* 1/2020 Muddu ................ G06F 16/254

OTHER PUBLICATIONS

Yang et al.: "Ontology-based Semantic Fusion of Traffic Information", DOI 10.1109/CSSS.2012.197 (Year: 2012).*
Yang et al., "Ontology-Based Semantic Fusion of Traffic Information", Computer Science&Services System (CSSS),2012 International Conference on, IEEE, pp. 762-772, Aug. 11, 2012.
Laudy et al., "Sementic Information Fusion Algebraic Framework Applied to Content Marketing", 2018 21 st International Conference on Information Fusion (Fusion), ISIF, pp. 2338-2345, Jul. 10, 2018.
Laudy et al., "High-level fusion based on conceptual graphs", Information Fusion, 2007 10th International Conference on, IEEE, PI, pp. 1-8, Jul. 1, 2007.
Search Report for French Application No. 20 12607 dated Aug. 12, 2021.
Search Report for International Application No. PCT/EP2021/083829 dated Feb. 9, 2022.

* cited by examiner

DIGITAL DATA TRACING METHOD

CROSS-REFERENCE TO RELATED APPLICATIONS

This is a National Stage application of PCT international application PCT/EP2021/083829, filed on Dec. 1, 2021, which claims priority from French Patent Application No. 20 12607, filed on Dec. 3, 2020, both which are incorporated herein by reference in their entirety.

FIELD

The present invention relates to a method for digitally tracing data from a plurality of data sources. The invention further relates to a computer product program and an associated readable storage medium.

BACKGROUND

In fields such as surveillance, many data coming from different data sources are collected and analyzed.

To reduce redundancies and thereby facilitate data analysis, data compression techniques, also called data merging, are used.

However, once the merging is completed, it is difficult to trace back to the original information. Furthermore, it is not easy to understand and verify the merging criteria.

However, such lack of monitoring of the operations carried out is problematic for certain critical applications, in particular when certain data sources are considered less reliable than others. The above makes the merged data less reliable and more difficult to use.

There is thus a need for a method for improving the understanding of data merging in order to facilitate the use of the merged data.

SUMMARY

To this end, the present description relates to a method for digitally tracing data coming from a plurality of data sources, the method being implemented by computer and comprising the steps of:
   a. obtaining initial data from a plurality of data sources, each initial datum comprising initial elements and initial links, each initial element having a type and a value, each initial element belonging to a first category of elements, called initial entities, or to a second category of elements, called initial relations, the initial links linking initial entities by an initial relation,
   b. determining a final datum on the basis of at least two initial data following the merging of initial elements of said initial data with one another according to a merging strategy, the merged initial elements belonging to the same category of elements and leading to obtaining a merged element, the merged element having a type and a value, and
   c. determining a merging history for each merged element, the merging history comprising the type and the value of each initial element from which the merged element originates, the type and the value of the merged element, and data relating to the merging strategy.

According to particular embodiments, taken alone or according to any technically possible combination, the method comprises:
   the merging strategy implements functions, each function being represented by a set of function elements each comprising a type and a value, the merging history comprising history elements and history links, each history element having a type and a value, the history elements belonging to:
   a. a first category of history elements called history entities, grouping the initial elements, the merged element and the function elements representative of the functions, and
   b. a second category of history elements, called history relations,
   history links linking history entities to each other through history relations;
   history relations and history links are representative of the merging strategy applied to the initial elements, via function elements, for obtaining the merged element;
   furthermore, each initial element has an initial history including the type and the value of the initial element, as well as data identifying the data source from which the initial element resulted, the merging history determined for each merged element including the initial history of each initial element from which the merged element originates;
   each history entity is associated with at least one supplementary datum chosen from:
   c. a timestamp indicating the date and/or time of generation of the history entity,
   d. a datum relating to the place of generation of the history entity,
   e. a datum relating to the computer by which the history entity was generated, and
   f. a datum relating to a user of the computer by which the history entity was generated;
   the initial data of at least one data source come from measurements made by a sensor;
   the method comprises:
   g. a step of acquisition of a display control for displaying the merging history determined for a merged element, and
   h. a step of displaying the merging history of the merged element, on a display;
   the initial data relate to at least one piece of equipment, the method comprising a step of implementing an action on the piece of equipment according to the final datum or data obtained, and at least one merging history.

The present description further relates to a computer program product comprising a readable storage medium, on which is stored a computer program comprising program instructions, wherein the computer program can be loaded on a data processing unit and implements a method such as described hereinabove when the computer program is implemented on the data processing unit.

The present description further relates to a non-transitory computer-readable medium including a computer program comprising software instructions which, when executed by a computer, implement a method as described hereinabove.

BRIEF DESCRIPTION OF THE DRAWINGS

Other features and advantages of the invention will appear upon reading hereinafter the description of the embodiments of the invention, given only as an example, and making reference to the following drawings.

DESCRIPTION OF EXAMPLE EMBODIMENTS

Figure 1:
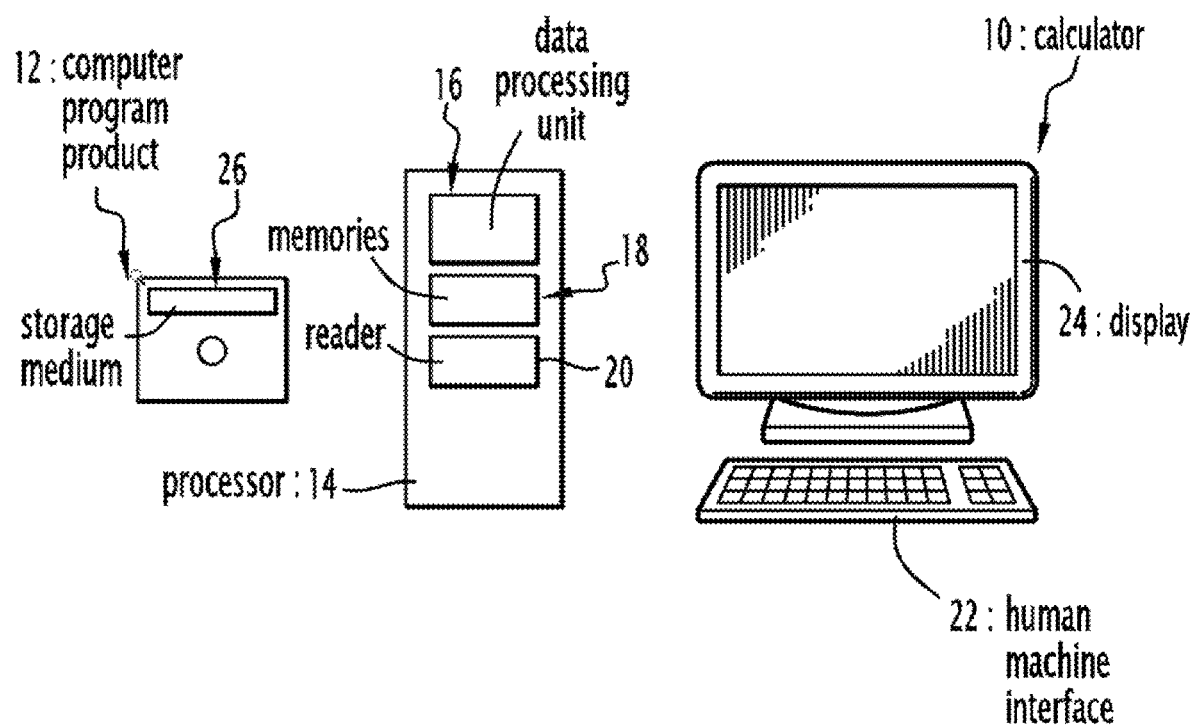
FIG. 1, a schematic view of an example of a computer for implementing a method of digital tracing of data,
   FIG. 2, a flowchart of an example of implementation of a method of digital tracing of data, FIG. 3, a schematic representation of an example of a final datum G obtained by merging two initial elements G1 and G2 of two separate initial data, FIG. 4, a schematic representation of an example of three initial histories, each associated with a distinct initial element, FIG. 5, a schematic representation of another example of initial history, FIG. 6, a schematic representation of an example of a merging history associated with a merged element obtained as a result of two mergings, the merging history having been represented in two parts for readability purposes, FIG. 6 showing only the first part, FIG. 7, a schematic representation of the second part of the merging history shown in FIG. 6, and FIG. 8, a schematic representation of different types and subtypes of entities.

A calculator 10 and a computer program product 12 are shown in FIG. 1.

The calculator 10 is preferentially a computer.

More generally, the calculator 10 is an electronic calculator suitable for manipulating and/or transforming data represented as electronic or physical quantities in registers of the calculator 10 and/or memories into other similar data corresponding to physical data in memories, registers or other types of display, transmission or storage.

The calculator 10 interacts with the computer program product 12.

As shown in FIG. 1, the calculator 10 includes a processor 14 comprising a data processing unit 16, memories 18 and a reader 20 of data storage medium. In the example illustrated in FIG. 1, the calculator 10 further comprises a human-machine interface 22, such as a keyboard, and a display 24.

The computer program product 12 includes a storage medium 26.

The storage medium 26 is a medium readable by the calculator 10, usually by the data processing unit 16. The readable storage medium 26 is a medium suitable for storing electronic instructions and apt to be coupled to a bus of a computer system.

As an example, the storage medium 26 is a USB key, a diskette or a floppy disk, an optical disk, a CD-ROM, a magneto-optical disk, a ROM, a RAM, an EPROM, an EEPROM, a magnetic card or an optical card.

The computer program 12 containing program instructions is stored on the storage medium 26.

The computer program 12 can be loaded into the data processing unit 16 and is suitable for leading to the implementation of a method of digital tracing of data, as described hereinafter in the description, when the computer program 12 is implemented on the processing unit 16 of the calculator 10.

Figure 2:
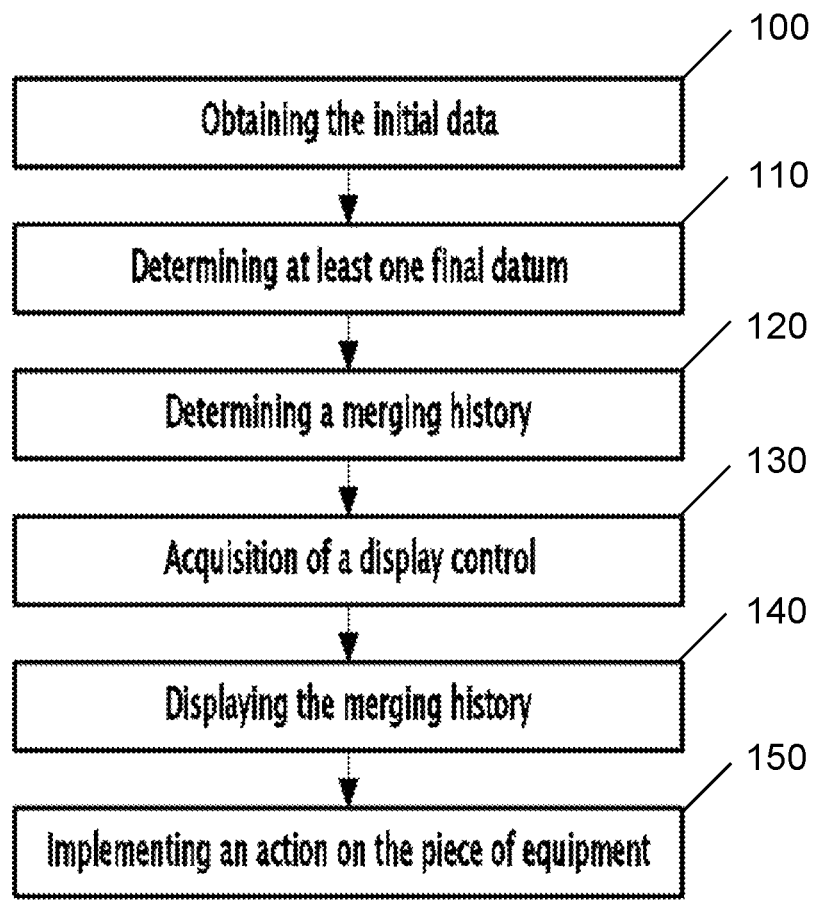

The operation of the calculator 10 will now be described with reference to FIG. 2 which schematically illustrates an example of the implementation of a method of digital tracing of data, and to FIG. 3 to 8 which are examples for illustrating certain steps of the method.

The term "digital tracing of data" means associating information with a datum indicating the origin of the datum and/or the actions which led to obtaining the datum from other data.

In the description, the terms "merging" and "compression" are used in an equivalent manner.

In the example described hereinafter, the method of digital tracing is implemented by the calculator 10 in interaction with the computer program product 12, i.e. is implemented by computer.

The method of tracing comprises a step 100 of obtaining the initial data Di. The initial data Di typically come from a plurality of distinct and heterogeneous data sources. The term "heterogeneous" means that the same information can be described differently depending on the data source considered.

The initial data Di are e.g. data relating to individuals, to installations or to equipment.

Data sources are databases of information. E.g. data sources are digital libraries, social networks, blogs, files created by an operator or a machine, GPS signal traces, or results of analysis of data from sensors (e.g. radar, AIS). Advantageously, the initial data Di of at least one data source come from measurements made by a sensor. The sensor is e.g. a camera, a sound sensor, or any sensor measuring a physical quantity (e.g. radar, AIS).

Each initial datum Di comprises initial elements Ei and initial links Li.

Each initial element Ei has a type and a value. The type of an element corresponds to a concept represented by the element. Each type is associated with a set of possible values. The value of an element is the value taken by the type of the element from the set of possible values.

Each initial element Ei belongs to a first category of elements, called initial entities Ci, or to a second category of elements, called initial relations Ri. The initial elements Ei belonging to the first category of elements differ from same of the second category of elements by the types of said elements, which are different.

Initial links Li link initial entities Ci to each other through an initial relation Ri. In particular, the initial entities Ci are representative of states (identity of a person, place) and the initial relations Ri establish a link between said states (action of one entity on another).

In one implementation mode, each initial datum Di is, thereby, in the form of an ontological representation. The ontological representation is e.g. a conceptual graph or a logical representation of order one, i.e. a representation comprising alphanumeric symbols and punctuation symbols. The symbols represent relations between real-world objects (Example: Location ([Car: "Titine"@V1], [Position: "48.853, 2.35"@ND] expresses that the car V1 is called Titine and is positioned at the location ND which is located at GPS coordinates (48.853; 2.35).

In general, an ontology is an entity formed by a set of knowledge, facts and rules relating to a given field, e.g. scientific, cultural, administrative, industrial or commercial know-how.

More precisely, an ontology is a set of concepts, wherein each concept can be in a relation with other concepts. A concept is a set of words referring to the same notion, typically synonyms. E.g. an aircraft is a concept which can also be referred to as a flying machine. However, the case of synonyms is not the only possible case. As an example, for the concept of aircraft and the concept of assets of a company, a new concept can be the aircraft of said company.

An ontology is representable as a graph the points of which are concepts, a relation being represented by a line between two points, as is the case for conceptual graphs. An ontology is also representable in the form of alphanumeric symbols, as is the case for logical representations of order one.

Figure 3:
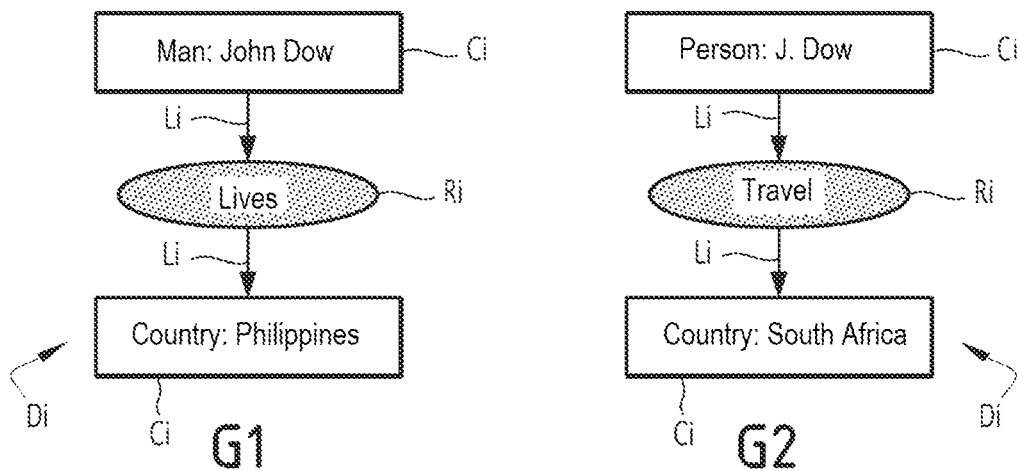
Figure 3:
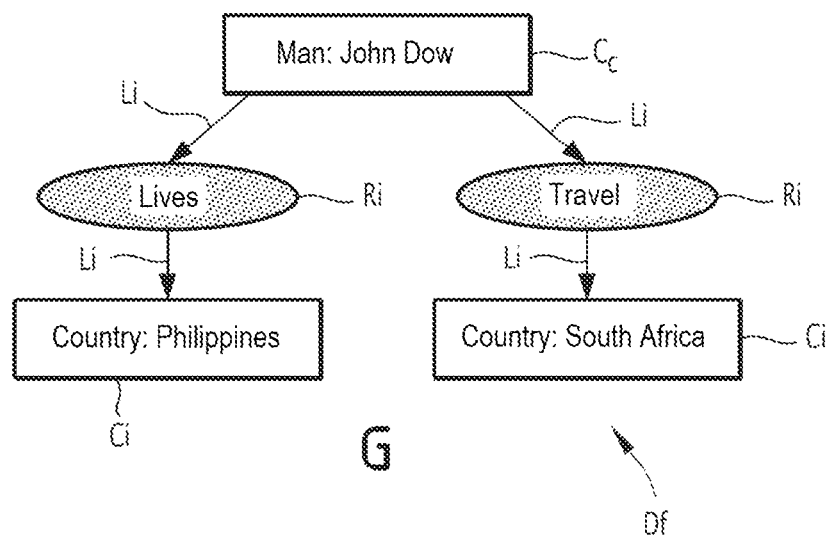

In the example illustrated in FIG. 3, two initial data Di are illustrated, one in the form of a conceptual graph G1 and the other in the form of a conceptual graph G2. In such example, each initial datum Di comprises two initial entities Ci, a relation Ri and two links Li linking each initial entity Ci to the relation Ri. More particularly, the initial datum Di represented by the conceptual graph G1 comprises: a first initial entity Ci of type "Man" and of value "John Dow", a second initial entity Ci of type "country" and of value "Philippines", and a relation Ri of type "Relation" and of value "Lives". The initial datum Di represented by the conceptual graph G2 comprises: a first initial entity Ci of type "Person" and of value "J. Dow", a second initial Ci entity of type "Country" and of value "South Africa", and a relation Ri of type "Relation" and of value "Travel".

A person skilled in the art will understand that the representation of the data in the form of conceptual graphs is given as examples, since the data can very well be represented in other forms. E.g. a logical one-order representation of conceptual graph G1 is: Lives ([Man: John Dow], [Country: Philippines]).

Advantageously, each initial element Ei is, furthermore, associated with an initial history Hi making possible the traceability of the initial element Ei, i.e. to trace back to information relating to the origin of the initial element Ei. Thereby, initial history Hi comprises the type and the value of the initial element Ei, and data identifying the data source from which the initial element Ei originates.

In an example of implementation, the initial history Hi has the same form as the initial data Di. Thereby, if the initial data Di is in the form of an ontological representation, such as a conceptual graph, the same will hold for the initial history Hi. In such example, the initial history Hi comprises initial history elements Ehi and initial history links Lhi. Each initial history element Ehi has a type and a value. Each initial history element Ehi belongs to:
  either to a first category of initial history elements known as initial history entities Chi,
  or to a second category of initial history elements, called initial history relations Rhi.

The initial history links Lhi link initial history entities Chi to each other through initial history relations Rhi. In particular, the initial history entities Ci are representative of the initial elements Ei and of the data sources, and the initial relations Ri establish a link between such elements.

Advantageously, the initial history relations Rhi and the initial history links Lhi can be used for establishing the origin of the corresponding initial element Ei.

Figure 4:
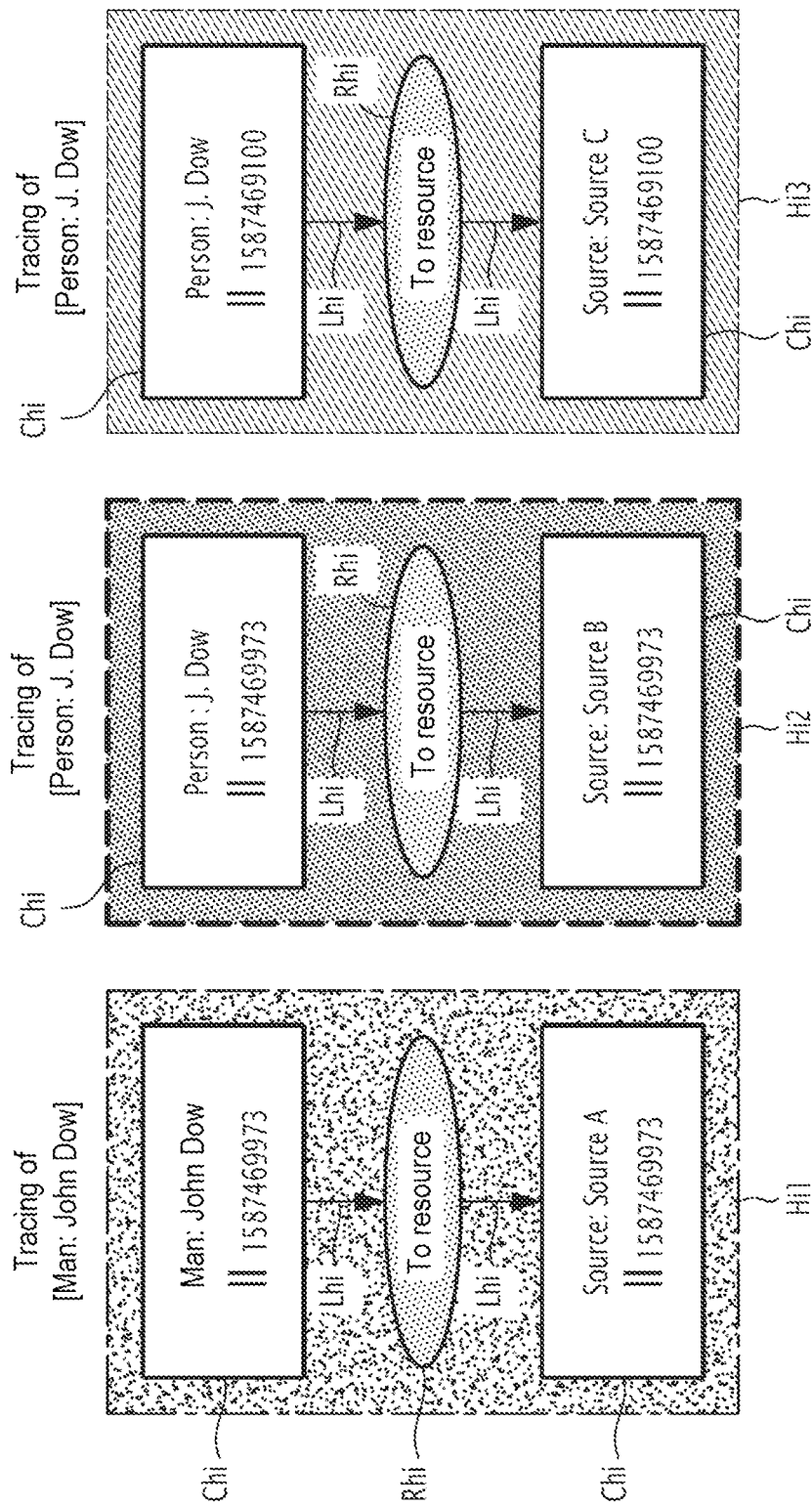

In the example shown in FIG. 4, three examples of initial histories Hi1, Hi2, Hi3 are shown. Each initial history Hi1, Hi2, Hi3 presents a first initial history entity Chi representative of the initial element Ei to which said initial history Hi corresponds, a second initial history entity Chi representative of the data source from which the initial element Ei originates, and an initial history relation Rhi linking the initial element Ei to the data source from which same is derived. Thereby, for the first initial history Hi1 which is the history of the initial entity "Man: John Dow":
  the first initial history entity is of type "Man" and of value "John Dow" (corresponds to the initial element),
  the second initial history entity has the type "Source" and the value "Source A", and
  the initial history relation is of type "relation" and of value "To resource".

Advantageously, each initial history entity Chi of an initial history Hi is associated with at least one timestamp indicating the date and/or time of generation of the history entity Ch. In the example shown in FIG. 4, the timestamp is shown as a succession of digits in each initial history entity Chi. This timestamp is e.g. of the UNIX type, i.e. refers to the number of seconds elapsed since Jan. 1, 1970 at midnight UTC.

Advantageously, each initial history Hi comprises at least one initial history entity Chi chosen from among an entity representative of:
  a date and time of creation of a data source (timestamp),
  a file considered in a data source, and
  a unit information represented on one or a plurality of indexed rows or lines of a file.

Figure 5:
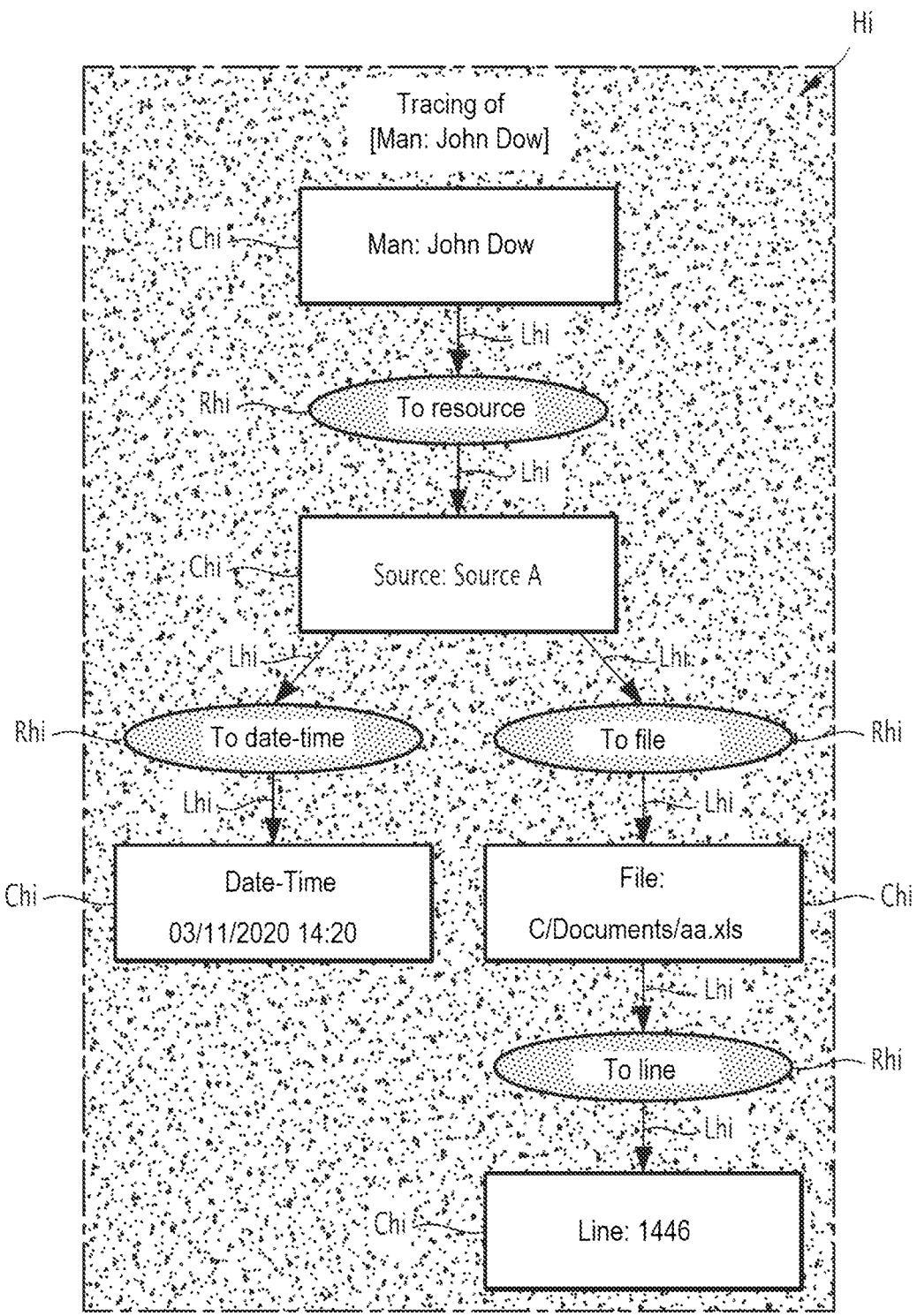

Thereby, in the example illustrated by FIG. 5, which is an extension of the first initial history Hi1 illustrated in FIG. 4, three additional initial history entities Chi and three additional initial history relations Rhi are represented, namely:
  an initial history entity Chi of type "Date-time" and of value "11/03/2020 14: 20",
  an initial history entity Chi of type "File" and of value "C/Documents/aa.xls",
  an initial history entity Chi of type "Line" and of value "1446",
  an initial history relation Rhi establishing a relation between the initial history entities "Source: Source A" and "Date-time: 3/11/2020 14: 20", of type "Relation" and of value "To date-time",
  an initial history relation Rhi establishing a relation between the initial history entities "Source: Source A" and "File: C/Documents/aa.xls" of type "Relation" and of value "To file", and
  an initial history relation Rhi establishing a relation between the initial history entities "File: C/Documents/aa.xls" and "Line: 1446", which has a type of "Relation" and a value of "To line".

In a variant, the initial history Hi of each or at least one entity is empty. Such is, in particular, the case when the original data source is unknown.

The tracing method comprises a step 110 of determining at least one final datum Df. The final datum Df comes from the merging of at least two initial elements Ei belonging to different initial data Di, in particular from different data sources. The merging is performed according to a merging strategy.

At the end of the merging, a merged element Ec with a type and a value, is obtained. E.g. the type of the merged element Ec is the type of one of the initial elements Ei from which the merged element Ec originates; and the value of the merged element Ec is the value of one of the initial elements Ei from which the merged element Ec originates.

In particular, the merging strategy stipulates that the merged elements belong to the same category of elements, i.e. either all to the first category of elements or all to the second category of elements.

In particular, in one example, the merging strategy implements functions F, namely:
  a compatibility function suitable for testing if the types of the elements to be merged are compatible,
  a similarity function suitable for testing the similarity between the values of the elements to be merged according to a similarity threshold, and
  a merging function suitable for defining the type and the value of the merged element Ec resulting from the merging.

Each function F has e.g. a name, input data, one or a plurality of parameters, and output data (results). Such information (input data, parameters, output data, function name) is e.g. represented by at least one type and at least one corresponding value in a history (merging history), each type and each associated value defining an element, called a function element.

The merging is e.g. carried out according to a method such as described in the document FR 2 986 636 A, the document FR 2 940 487 A or in the article by Laudy, C., Ganascia, J. G., & Sedogbo, C. (2007, July), High-level fusion based on conceptual graphs. In 2007 10*th International Conference on Information Fusion* (pp. 1-8) IEEE.

An example of final datum Df in the form of a conceptual graph G is illustrated in FIG. 3. The final datum Df comes from the initial data Di represented by the conceptual graphs G1 and G2. In particular, the entity Ci "Man: John Dow" of the initial datum Di (first datum) represented by the first conceptual graph G1 was merged with the entity Ci "Person: J. Dow" of the initial datum Di (second datum) represented by the second conceptual graph G2. The result of the merging is the merged entity Cc "Man: John Dow". Thereby, in the above example, the type and the value of the merged entity Cc are the type and the value of the first datum. Apart from the merged initial entities Ci which have been replaced by the merged entity Cc, the final datum Df comprises the same elements and links as the initial data Di.

The tracing method comprises a step 120 of determining a merging history Hc for each merged element Ec.

The merging history Hc is a datum making it possible, in particular, to trace back to the initial elements Ei from which the merged element Ec originates. The merging history Hc thereby includes information about the type and the value of each initial element Ei from which the merged element Ec originates, the type and the value of the merged element Ec, and data relating to the merging strategy.

In an example of implementation, the merging history Hc has the same form as the initial data Di and the final datum Df. Thereby, if the initial data Di are in the form of an ontological representation, such as a conceptual graph, the same will hold for the final datum Df and the merging history Hc.

In such example, the merging history Hc comprises history elements Eh and history links Lh. Each history element Eh has a type and a value. The types of history elements Eh comprise, in particular, the types of the initial elements Ei, of the merged element Ec, and of the function elements representative of the functions F used in the implementation of the merging strategy. The values of the entities of the history graphs are e.g. the values of the initial elements Ei, of the merged element Ec and of the function elements representative of the functions F used during the implementation of the merging strategy. For the function elements, the values represent e.g. the name of the chosen compatibility function, the name of the chosen similarity function, the name of the merging function or the value of the similarity threshold.

The history elements Eh belong to:
  either to a first category of history elements known as history entities Ch, grouping together the initial elements Ei, the merged element Ec and the function elements,
  or to a second category of history elements, called history relations Rh.

The history links Lh link history entities Ch to each other via the history relations Rh. In particular, the history entities Ch are representative of the initial elements Ei, of the merged element Ec and of the function elements representative of the functions F of the merging strategy, and the initial relations Ri establish a link between said elements.

Advantageously, the history relations Rh and the history links Lh are representative of the merging strategy applied to the initial elements Ei, via the function elements, for obtaining the merged element Ec.

Advantageously, the merging history Hc determined for each merged element Ec includes the initial history Hi of each initial element Ei from which the merged element Ec originates. Such inclusion leads to a non-loss of information during multiple mergings.

Figure 6:
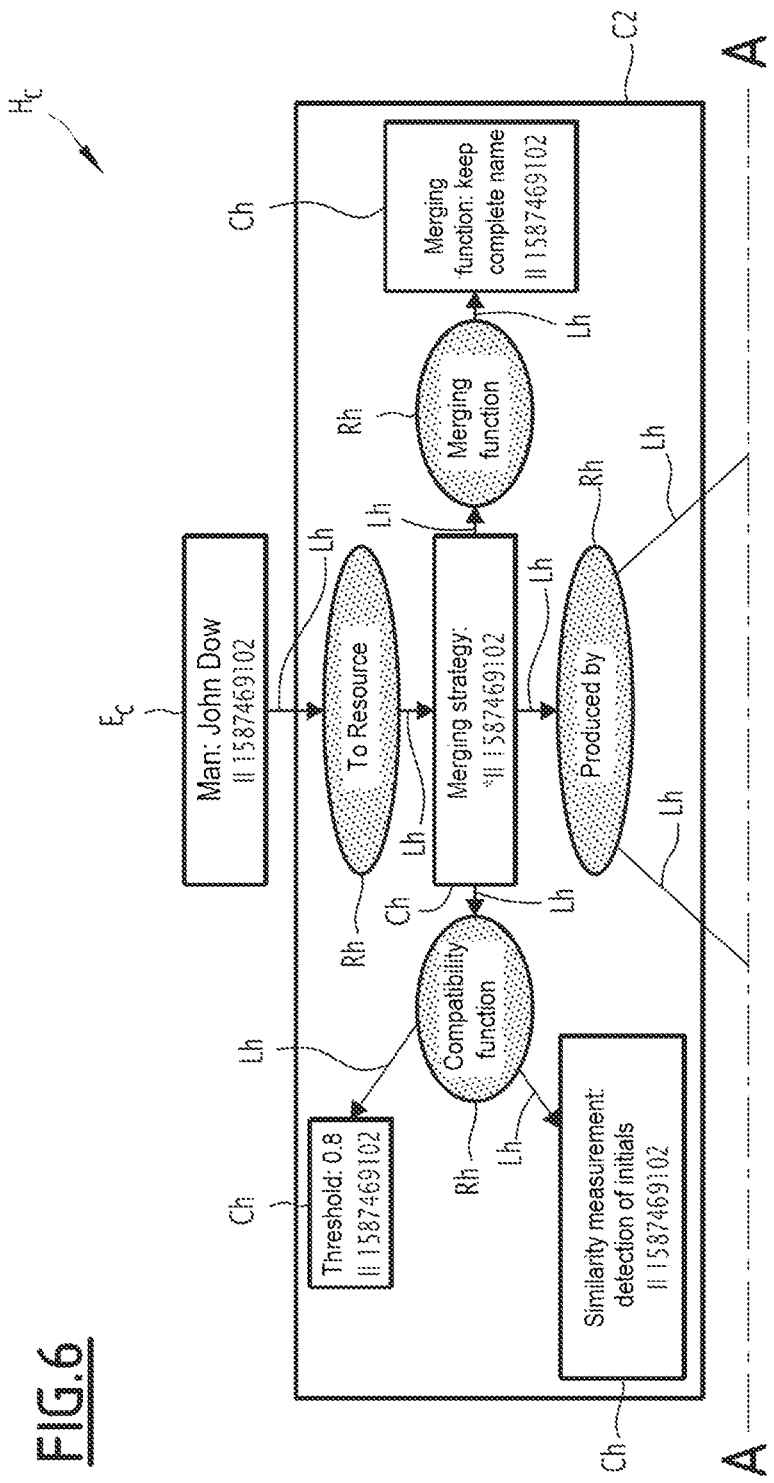
Figure 7:
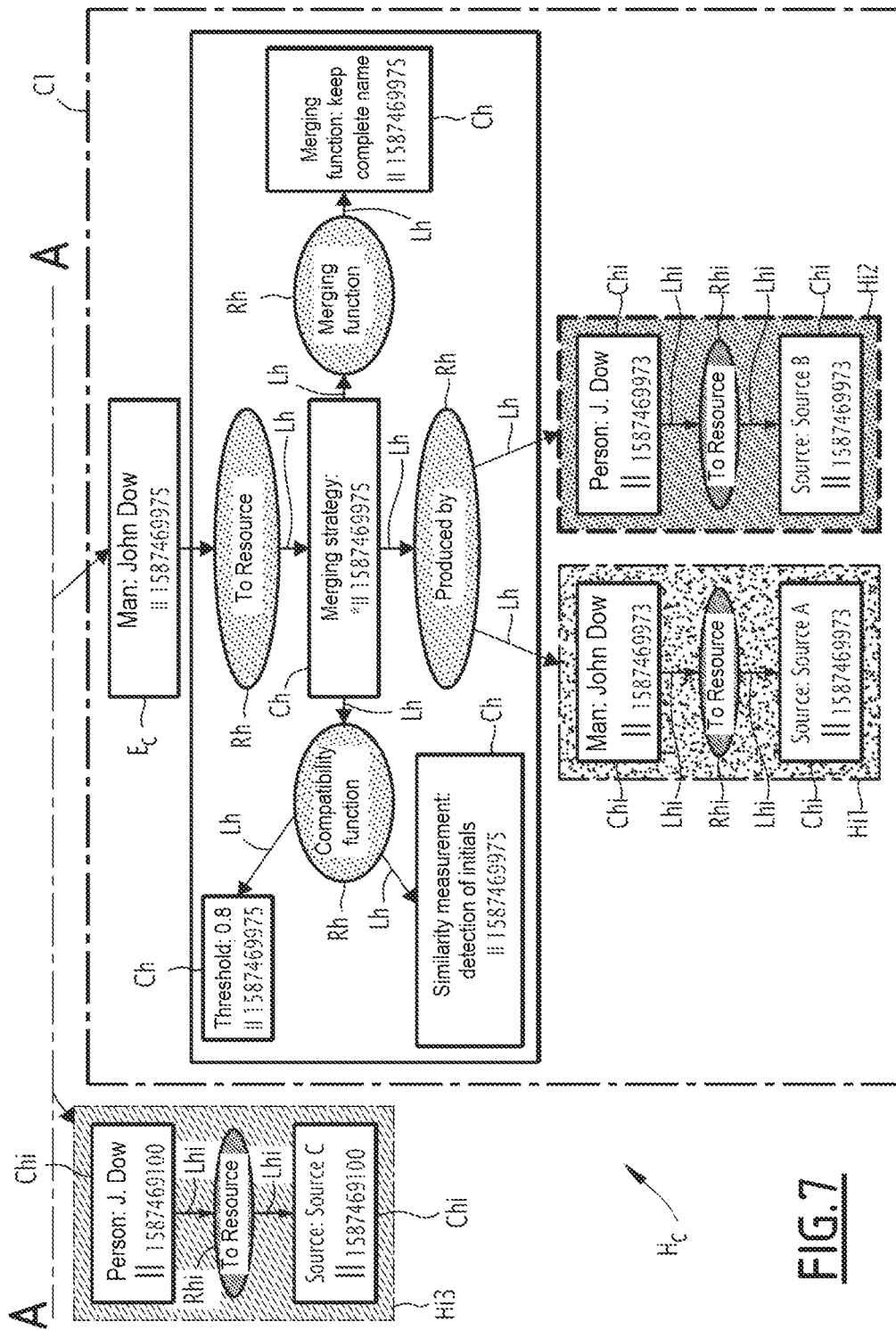

An example of history Hc is shown in FIGS. 6 and 7 for a merged element Ec obtained as a result of two mergings of elements. The first merging is illustrated in FIG. 7 and the second merging is illustrated in FIG. 6.

The first merging was used for obtaining the merged entity Ec "Man: John Dow", from the initial entities "Man: John Dow" and "Person: J. Dow". Box C1 of the history Ec gives information about the first merging.

More particularly, the part of the merging history Hc relating to the first merging comprises:
  the merged element Ec "Man: John Dow" resulting from the first merging,
  the initial histories Hi1 and Hi2 of the initial entities Chi from which the merged element Ec originates,
  the history entities Ch and the history relations Rh related to the merging strategy comprising:
    a history entity Ch of type "Merging function" and of value "keep full name",
    a history entity Ch of type "Merging strategy" and of value "*",
    a history entity Ch of type "Threshold" and of value "0.8"
    a history entity Ch of type "Measure of similarity" and of value "Detection of initials",
    a history relation Rh of type "Relation" and of value "To Resource",
    a history relation Rh of type "Relation" and of value "Merging function",
    a history relation Rh of type "Relation" and of value "Compatibility function", and
    a history relation Rh of type "Relation" and value "Produced by".

The second merging led to obtaining the merged entity Ec "Man: John Dow", from the initial entity "Person: J. Dow" and from the entity resulting from the first merging "Man: John Dow". Box C2 of the history Ec gives information about the second merging.

The part of the merging history Hc relating to the second merging comprises, in particular:
  the merged element Ec "Man: John Dow" resulting from the second merging,
  the entity histories from which the merged element Ec originates: initial history Hi3 and the part of history relating to the first merging, and
  the history entities Ch and the history relations Rh relating to the merging strategy which are, in such case, the same as for the first merging.

Figure 8:
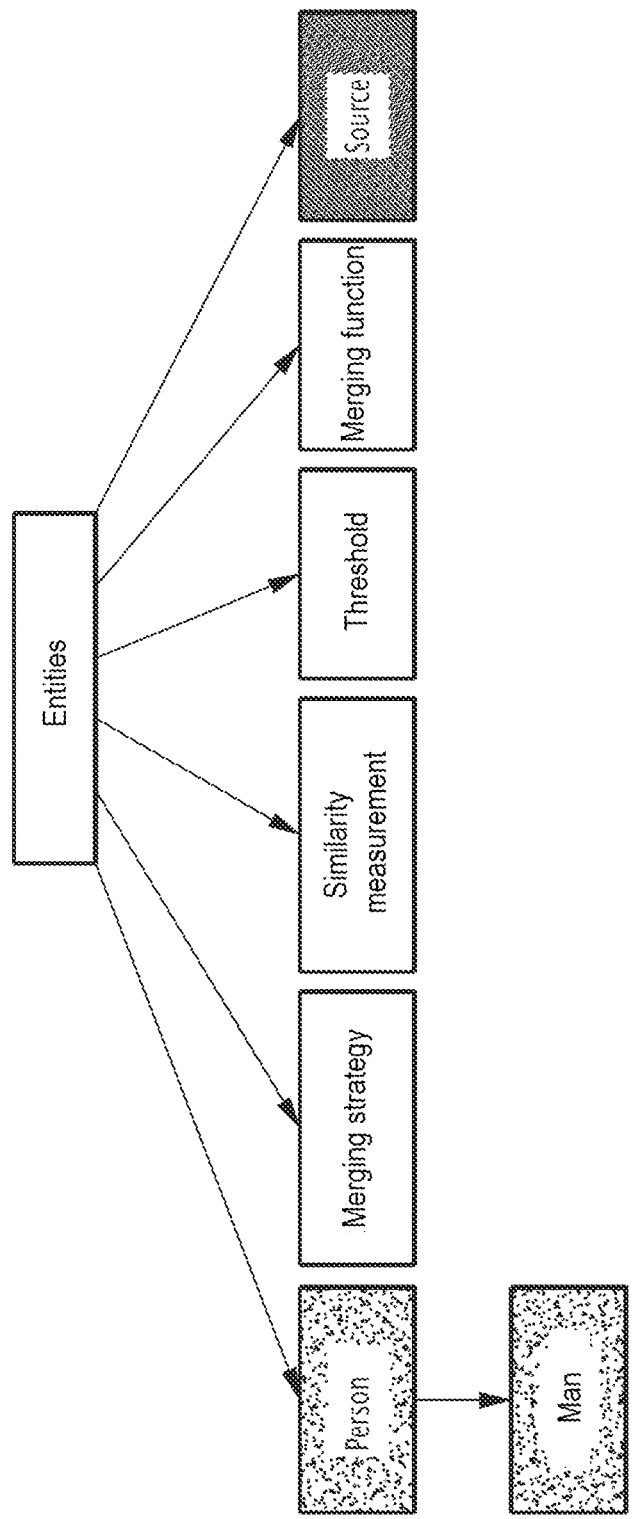

All the types of history entities Ch corresponding to the example shown in FIGS. 6 and 7 are summarized in FIG. 8. The types of entity in said example are:
  "Person" and "Man", the entities referring to the initial and merged entities, the type "Man" being a subtype of the type "Person".
  "Merging strategy", "Measure of similarity", "Threshold", "Merging function", such entities relating to the merging strategy, and
  "Source", such entity relating to the data sources.

Advantageously, each history entity Ch is associated with at least one complementary datum chosen from:
- a timestamp indicating the date and/or time of generation of the history entity Ch (shown in the entity boxes of the examples in FIGS. 6 and 7),
- a datum relating to the place of generation of the history entity Ch, and
- a datum relating to the computer by which the history entity Ch was generated,
- a datum relating to a user of the computer by which the history entity Ch was generated.

Optionally, the tracing method comprises a step 130 of acquisition of a display control for displaying the merging history Hc obtained for a merged element Ec. E.g., the control is issued by an operator and is acquired via the human-machine interface 22 of the calculator 10. The control is e.g. issued for verifying where the merged elements Ec come from.

The tracing method comprises a step 140 of displaying the merging history Hc of said merged element Ec on the display 24 of the calculator 10. Depending on the history displayed, the final data Df are e.g. considered either reliable or unreliable, in particular if the original data source is considered either reliable or unreliable.

Optionally, when the initial data Di relate to at least one piece of equipment, the method comprises a step 150 of implementing an action on the piece of equipment according to the final datum or data Df obtained, and of at least one merging history Hc. E.g., if the initial data Di and the final data Df relate to the maintenance of equipment, the maintenance action corresponding to the final data Df is performed on the equipment, in particular if it has been determined that the final data Df are reliable given the merging histories.

Thereby, the present method can be used, through the determination of a merging history Hc, for improving the understanding and the reliability of the data resulting from a data merging, as well as the understanding as such, as an operation on the data. The use of the merged data is thereby facilitated.

Thereby, the present method is particularly applicable to the technical field of information processing, with application e.g. to the decision-making or to the analysis of complex situations or systems, in particular when the information to be merged comes from various heterogeneous sources of information. More particularly, many military and civilian applications use analysis and decision systems based on information from a plurality of heterogeneous sources, such as e.g. a plurality of sensors (e.g. perimeter surveillance, target detection and classification, automatic guiding of munitions for the military field, for the civilian field: industrial maintenance, weather forecasting, remote sensing).

An application is e.g. the analysis of data from heterogeneous sources for the collection of evidence. In such context, semantic merging is used for merging heterogeneous data from different data sources. The traceability provided by the present method makes the collected evidence reliable.

Another application is e.g. the study of information exchanged on social networks where information of different levels of quality is used. In particular, different levels of credibility are attributed to the different players of social networks. Thus, when using the information spread through social networks, the present method is used for tracing back to the origin of the information, which is used for assessing the reliability thereof.

The present can be used in particular for (I) tracing the different mergings carried out (ii), following the steps carried out while keeping the order of the completion thereof, (iii) having a proof of the steps carried out, and (iv) understanding the steps carried out with a need for interpretability.

In one embodiment, the method is used for keeping a history of all the mergings carried out. Traces of mergings are e.g. represented using conceptual graphs with a specific ontology consisting of (I) subtype and supertype of the merged entity; (ii) an ontology specific to traceability, representing information relating to merging, and (iii) an ontology specific to the sources of information. The entities and the relations of the history graph, representing the history of the different mergings for a given entity, are used for representing the similarity function and the associated threshold, the merging function, and the compatibility function associated with the mergings. Such traces are represented for each entity or relation in the form of an additional property which represents the history thereof. Each piece of information is preferentially time-stamped at the time when is created, so as to keep a safe and unambiguous record.

The present method proposes following the process of semantic merging of heterogeneous data by adding to each merged entity, a history in the form of a conceptual graph with its own formalism thereof. Such solution makes it possible to follow the evolution of the merging of each concept and relations. Adding the history to each entity facilitates the history and the readability of the information by knowing for each entity where same comes from. Using the same formalism (conceptual graphs) and storing the history information in the same form as the history as such leads both to a homogeneity of the information and, whether it is desired to condense the history (history graph) or to merge two histories (two or a plurality of history graphs), to defining similarity and merging functions specific to the history graph.

Thereby, the present method has in particular the following advantages: (i) the trace of the different mergings carried out; (ii) the trace of all the parameters and merging strategy; (iii) the use of conceptual graphs for representing the trace (the same way of representing knowledge as the information per se which will be merged) leads to merging traces if same are redundant, so as to make traceability information condensed; (iv) the method is generic and adaptable to any use case; (v) the method allows an operator to understand the different steps which led to the concise information.

A person skilled in the art will understand that the embodiments described hereinabove can be combined so as to form new embodiments, provided that same are technically compatible. In particular, variants of representation of initial data, final data and histories are compatible with the present method. Furthermore, the examples described relate to the merging of entities, but the present method is also compatible with the merging of relations. In addition, the types and the values of the entities and relations mentioned are not limiting and should be adapted according to the intended application.

The invention claimed is:

1. A method of digitally tracing data from a plurality of data sources, the method being implemented by computer and comprising:
obtaining initial data from a plurality of data sources, each initial datum of the initial data comprising initial elements and initial links, each initial element having a type and a value, each initial element belonging to a first category of elements, called initial entities, or to a second category of elements, called initial relations, the initial links linking initial entities by an initial relation, determining a final datum on the basis of at least two initial data following the merging of initial elements of said initial data with one another according to a merging strategy, the merged initial elements belonging to the same category of elements and leading to obtaining a merged element, the merged element having a type and a value, and determining a merging history for each merged element, the merging history comprising the type and the value of each initial element from which the merged element originates, the type and the value of the merged element, and data relating to the merging strategy, wherein the merging strategy implements functions, each function being represented by a set of function elements each comprising a type and a value, the merging history comprising history elements and history links, each history element having a type and a value, the history elements belonging to:
- a first category of history elements called history entities, grouping the initial elements, the merged element and the function elements representative of the functions, and
- a second category of history elements, called history relations, the history links linking history entities to each other via history relations, and wherein the history relations and the history links are representative of the merging strategy applied to the initial elements via the function elements, for obtaining the merged element.

2. The method according to claim 1, wherein each initial element further has an initial history comprising the type and the value of the initial element, as well as data identifying the data source from which the initial element originates, the merging history determined for each merged element including the initial history of each initial element from which the merged element originates.

3. The method according to claim 1, wherein each history entity is associated with at least one supplementary datum selected from:
- a timestamp indicating the date and/or time of generation of the history entity,
- a datum relating to the place of generation of the history entity,
- a datum relating to the computer by which the history entity was generated, and
- a datum relating to a user of the computer by which the history entity was generated.

4. The method according to claim 1, wherein the initial data of at least one data source come from measurements made by a sensor.

5. The method according to claim 1, wherein the method comprises:
- acquisition of a display control for displaying the merging history determined for a merged element, and
- displaying the merging history of said merged element on a display.

6. The method according to claim 1, wherein the initial data relate to at least one piece of equipment, the method comprising implementing an action on the piece of equipment according to the final datum or data obtained, and at least one merging history.

7. A computer program product including a non-transitory computer-readable storage medium on which is stored a computer program comprising program instructions, wherein the computer program can be loaded on a data processing unit and leads to implementing a method according to claim 1 when the computer program is implemented on the data processing unit.

8. A non-transitory computer-readable medium including a computer program comprising software instructions which, when executed by a computer, implement a method according to claim 1.

* * * * *